United States Patent [19]
Symoniak et al.

[11] 3,721,064
[45] March 20, 1973

[54] ISOTHERMAL PROCESS FOR OLEFIN SEPARATION

[75] Inventors: Martin F. Symoniak, Mahopac, Max N. Y. Lee, Yorktown Heights, both of N.Y.

[73] Assignee: Union Carbide Corporation, New York, N.Y.

[22] Filed: Feb. 25, 1971

[21] Appl. No.: 118,608

[52] U.S. Cl. .........................55/62, 55/95, 260/676
[51] Int. Cl. ..........................B01d 53/04, C07c 9/02
[58] Field of Search ...55/62, 67, 75, 26; 260/676 MS

[56] References Cited

UNITED STATES PATENTS

| | | | |
|---|---|---|---|
| 3,184,518 | 5/1965 | Sanders et al. | 55/75 |
| 3,201,490 | 8/1965 | Lacey et al. | 260/676 MS |
| 3,422,003 | 1/1969 | Anstey et al. | 260/676 MS |
| 3,422,005 | 1/1969 | Avery | 260/676 MS |

*Primary Examiner*—Charles N. Hart
*Attorney*—Paul A. Rose, Harrie M. Humphreys, Richard G. Miller and Robert C. Cummings

[57] ABSTRACT

Straight-chain and branched-chain monoolefins are separated by size selective molecular sieving in a vapor phase, isobaric, isothermal fixed bed process employing adsorption co-purge and countercurrent purge steps in cyclic sequence. The process utilizes a paraffinic hydrocarbon of higher carbon number than the olefin for the purge which permits distillation recovery of the separated olefins from the purge paraffin which is recycled. The straight chain paraffin content of the purge is greater than the straight chain olefin content of the feed whereby the molecular sieve is at least partially loaded with straight chain paraffin during all steps of the process.

3 Claims, 1 Drawing Figure

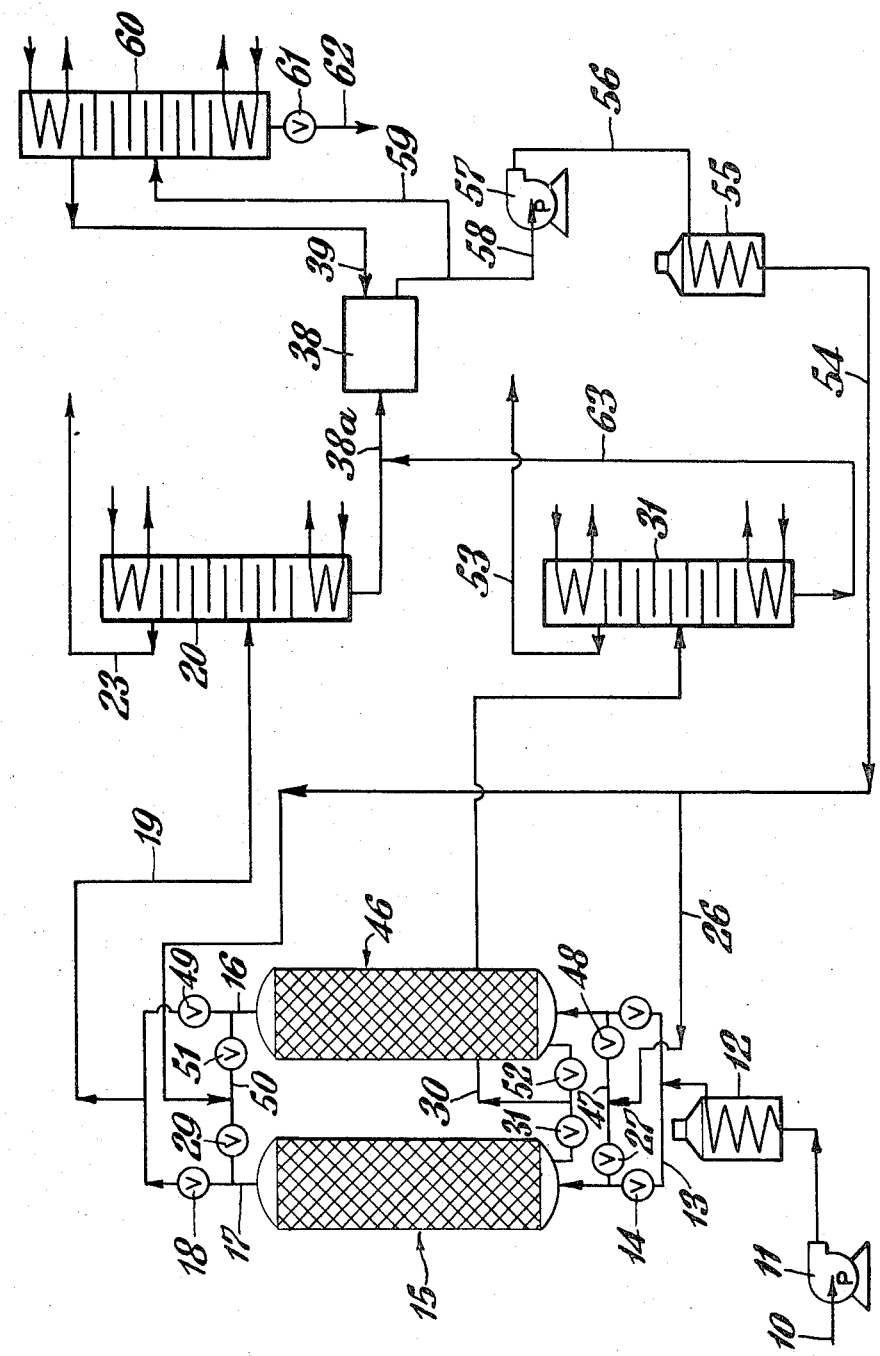

ISOTHERMAL PROCESS FOR OLEFIN SEPARATION

It is known that molecular sieve type 5A is capable of separating straight chain hydrocarbons from non-straight chain hydrocarbons by the acceptance — exclusion principle, based on molecular size. Many processes based on this have been successfully applied to separations of paraffinic hydrocarbon mixtures, but few have been proposed for the bulk separation of straight chain monoolefin hydrocarbons from non-straight chain monoolefins. Such separations have presented technical problems to a large degree associated with the ease of polymerization of the olefins with resultant loss of adsorption capacity of the molecular sieve. It has been proposed to add chemical modifiers to the molecular sieve or to the process to inhibit such polymer formation. The use of strong desorbent agents or a combination of high temperature and vacuum to desorb the normal olefin product and polymer from the molecular sieve adsorbent has also been proposed to help restore the adsorption capacity of the coked molecular sieve.

A new process has been found by which the bulk separation of monoolefin mixtures is done without the complicated procedures proposed by the prior art. This new process is especially suitable for the separation and recovery of normal butene and isobutene from feeds containing them in bulk quantities, i.e., greater than 10 mole percent. It is, however, also applicable for the separation and recovery of similar mixtures of pentenes and hexenes.

Since the process can continuously reject polymer molecules by distillation purification of the purge fluid recycle stream it is not critically dependent upon the feedstock's being free of easily polymeriable impurities such as diolefins and acetylenes. However, if the monoolefin products are intended to meet some purity specification relative to these highly unsaturated hydrocarbons and/or saturated hydrocarbons, it is preferred that the feed be purified to the specification prior to the sieving process. Diolefins and acetylenes may be controllably hydrogenated and paraffins can be removed by extractive distillation, both being well-known techniques.

The process comprises the steps of adsorption, wherein a hydrocarbon vapor feed stream comprising straight-chain and branched-chain monoolefin hydrocarbons is passed into one end of an adsorber containing 5A molecular sieve and obtaining from the other end of said adsorber a first effluent comprising a branched-chain monoolefin hydrocarbon and a straight paraffin hydrocarbon optionally when very high purity of recovered streams is desired, a co-purge step wherein a hydrocarbon vapor purge stream comprising a straight-chain paraffin hydrocarbon is passed into said one end of said adsorber and obtaining from said other end a second effluent comprising a branched-chain monoolefin hydrocarbon and, essentially, a countercurrent purge step wherein a hydrocarbon vapor purge stream comprising a straight-chain paraffin hydrocarbon is passed into said other end of said adsorber and obtaining from said one end a third effluent comprising a straight-chain monoolefin hydrocarbon and a straight-chain paraffin hydrocarbon, all of said steps being isobaric and isothermal, and the partial pressure of the straight chain paraffin content of the vapor purge stream being greater than the partial pressure of the straight-chain monoolefin content of the vapor feed stream, and separately recovering branched-chain monoolefin from said first effluent and straight-chain monoolefin from said third effluent.

Synthetic zeolite type A in its calcium cation exchanged form as type 5A is the preferred adsorbent. Other useful zeolites of natural origin or synthesize having pore sizes of about 5 angstroms include chabazite, mordenite, gmelinite erionite and those known as types D, R, S and T.

The instant process is of immediate interest for the recovery of purified normal butene and isobutene from the vent gas of a butadiene production process. Two typical vent gas compositions are shown in Table I. Such streams would be pretreated by partial hydrogenation to convert the acetylenes and dienes to olefins and by extractive distillation to separate olefins and paraffins. Partial hydrogenation and extractive distillation are well known industrial processes. The treated monoolefin feed would contain less than 500 ppm dienes and acetylenes and a relatively minor amount, less than 10 percent of paraffins. The acetylene and diene removal is important because of their rapid polymerization in the molecular sieve, while minor amounts of paraffins act only as diluents in the process.

In addition to the i/n separation of butenes, it is expected that the process can be applied to the separation of pentenes and hexenes. Higher carbon number olefins such as heptenes, octenes, nonenes and the like are not recommended since they would require either adsorption temperatures or low, subatmospheric pressures for vapor phase molecular sieving.

The process should satisfactorily separate the straight-chain olefins from the branched-chain olefins from feed mixtures of the four, five and six carbon olefins. Such mixtures do, however, require more complex fractional distillation apparatus for separation and recovery from the purge paraffin hydrocarbon. Therefore, it is preferred to prefractionate such mixtures and operate the instant process on an olefin feed having a single carbon number.

The purge is a paraffinic hydrocarbon having one to three, preferably two, more carbon atoms than the olefin feed and have a higher straight-chain paraffin content than the feed straight chain olefin content. The first of these requirements is so that the adsorption affinity of the molecular sieve for the adsorbing straight-chain olefin and the adsorbing straight-chain paraffin will be essentially equal whereby there is no notable heat zone developed in the adsorption or countercurrent desorption steps of the process and the process thus is isothermal within the adsorber. The second requirement is so that the adsorber is partially loaded with straight-chain paraffin throughout all steps of the cycle.

The process is both isobaric and isothermal, meaning that all streams, feed and purge, are both pressurized and heated to essentially the same degree. Also, the process is vapor phase so when selecting the upper pressure for a given temperature or conversely the lower temperature for a given pressure, the limiting criteria is the dew point of the paraffin purge stream.

The only constraint interposed by the olefin feed stream is that the upper temperature limit be below 300°F. because of rapid polymerization of the olefins at 300°F. and above.

A preferred embodiment of this invention will be described for the two-bed system shown schematically in the drawing.

Adsorber 15 is placed on its adsorption step, having previously been on the countercurrent purge step and, therefore, is at a temperature of 100°C. and a pressure of 15 psig and the adsorbent contains adsorbed n-hexane equivalent to these conditions. Olefin feedstock enters conduit 10 and is pumped to 15 psig in pump 11, heated to 100°C. in heater 12 and passed through conduit 13 and inlet control valve 14 to adsorber 15 containing calcium zeolite A in the form of 1/16 inches pellets. The olefin feed vapor passes upwardly through the molecular sieve bed displacing the normal hexane gas phase toward the top and out the effluent conduit 17. As the n-hexane partial pressure in the gas phase is reduced desorption of normal hexane from the zeolite adsorbent occurs and normal olefin is adsorbed while branched-chain olefin remains in the gas phase and flows our effluent conduit 17 in mixture with normal hexane gas. The hexane desorption and normal olefin adsorption action proceeds upward through the bed, but is not evidenced by a notable temperature gradient. The adsorption step may be terminated upon or shortly after the appearance of normal olefin in an increasing concentration in the effluent, but is preferably terminated earlier since any normal olefin exiting during the adsorption step is not recovered as normal olefin purified product, but instead is found as impurity in the branched-chain olefin purified product. The optimum point for termination of the adsorption step is found to be earlier than the increasing appearance or breakthrough point to the extent that breakthrough occurs during the latter part of the co-current purge step which follows. The composition of the adsorption stroke effluent gas may conveniently be determined by gas sampling at a sample port (not shown) in conduit 17 at a point close to the adsorber. By means of sampling the adsorption stroke effluent gas and analysis for its n-olefins content, for example by gas chromatographic analysis, the exit of the stoichiometric point, which is the point at which the n-olefin concentration has risen to one-half its full feed concentration, is readily determined. This point is then deemed to be 100 percent adsorbent bed utilization. Under uniform adsorption conditions of essentially constant pressure, temperature, feed composition and feed rate, excellent product purities and recoveries are obtained at bed utilization falling in the range of 70 to 90 percent. That is, by terminating the adsorption stroke in the range of 70 to 90 percent of the time found for full bed utilization. During the adsorption step the effluent passing from the adsorber 15 through conduit 17, is passed through valve 18 and conduit 19 to fractional distillation column 20 from which branched-chain olefin purified product is taken as overhead through conduit 23 and n-hexane purge fluid is taken from bottoms conduit 38a. The composition of the adsorption step effluent changes as the adsorption step progresses from a high concentration of hexane to a lower concentration while the concentration of branched-chain olefin increases.

A blending reservoir although not shown may be provided to improve the fractionator operation. The adsorption step pressure provided by pump 11 may be maintained by operating the fractionator under pressure or by employing other pressure control as for example, valve 18 may be a back-pressure valve.

In the two-adsorber system of this example the co-purge step is described for adsorber 46 as will also be the countercurrent purge step to exemplify a continuous operation wherein one adsorber is adsorbing while the other is co-purging and counter purging. Adsorber 46 having completed its adsorption step contains both straight chain and non-straight chain olefins in the gas phase. It is the purpose of the co-purge step to transfer at least a major amount of the non-straight chain olefins to the non-straight chain olefin distillation and product recovery system. To effect this, normal hexane from reservoir 38 enters conduit 58 and is pumped to 15 psig in pump 57, heated to 100°C. in heater 55 and passed through conduit 54, conduit 26, conduit 47 and valve 48 into adsorber 46 containing calcium zeolite A in the form of 1/16 inch diameter pellets having both n-hexane and n-olefin in the adsorbed state. Adsorber 46 is in a flow-through condition so that as the heated-pressurized hexane enters via valve 48 an effluent exits through conduit 16. This effluent contains non-straight chain olefin which is enriched with respect to straight-chain olefin with which it composed the original feed to the extent that additional straight-chain olefins may be adsorbed in the portion of the bed that was not utilized in the adsorption step. Some additional n-hexane may also be adsorbed. The co-purge effluent thus contains non-straight chain olefin plus hexane and some non-sorbed straight-chain olefin. This stream flows through conduit 16, valve 49, conduit 19 to fractional distillation column 20 where its olefin components become part of the overhead product exiting through conduit 23 while its hexane becomes part of the bottoms product exiting through conduit 38a to reservoir 38. The function of the co-purge step is adequately achieved with a relatively small quantity of n-hexane purge.

Adsorber 46, having completed the co-current purge step is now ready for the countercurrent purge. Hexane from reservoir 38 enters conduit 58 and is pumped to 15 psig in pump 57, heated to 100°C. in heater 55 and passed through conduits 54 and 50, valve 51 and conduit 16 into the top of adsorber 46. The n-hexane gas strip purges the adsorbed n-olefin from the adsorbent and is itself adsorbed in essentially an equivalent amount thereby effecting desorption of the n-olefin without a notable temperature change appearing as a result of the n-olefin desorption. This step is thus an exchange desorption step which is essentially isothermal. During the countercurrent purge effluent exits from the bottom of the adsorber through valve 52 and conduit 30 to fractional distillation column 31. Purified n-olefin product is recovered as overhead through conduit 53 and hexane passes as bottom product through conduit 63 and conduit 38a to hexane reservoir 38.

In FIG. 1 also is shown hexane purification distillation column 60. It may be employed intermittently or continuously to separate higher boiling hydrocarbons, resulting from olefin polymerization reactions, from the n-hexane purge recycle system to reduce their build-up in the adsorbers which would lead to adsorbent deactivation.

TABLE 1

COMPOSITION OF TWO COMMERCIAL BUTADIENE ABSORBER VENT STREAMS

| COMPONENT | (A) Wt% | (B) Wt% |
| --- | --- | --- |
| C–2's | .20 | — |
| Propane | .80 | — |
| Propylene | .62 | .1 |
| Propadience | .53 | — |
| Methyl Acetylene | 100 ppm | 10 ppm |
| Vinyl Acetylene | 500 ppm | 200 ppm |
| Butadiene | 2.0 | 1.0 |
| Isobutene | 26.65 | 47.5 |
| Butene-1 | 16.30 | 29.8 |
| Cis Butene-2 | 4.05 | 5.9 |
| Trans Butene-2 | 7.03 | 6.4 |
| Normal Butane | 23.80 | 6.5 |
| Isobutane | 16.80 | 2.2 |
| C–5+ | .61 | — |
| Water | .61 | .6 |
| Total | 100.0 | 100.0 |

What is claimed is:

1. Process which comprises the steps of adsorption, wherein a hydrocarbon vapor feed stream comprising straight-chain and branched-chain monoolefin hydrocarbons having from four to six carbon atoms inclusion is passed into one end of an adsorber containing a molecular sieve having a pore diameter of about 5 Angstroms and having adsorbed thereon a straight chain hydrocarbon and obtaining from the other end of said adsorber a first effluent comprising a branched-chain monoolefin hydrocarbon and said straight chain paraffin hydrocarbon, a co-purge step wherein a hydrocarbon vapor purge stream comprising a straight-chain paraffin hydrocarbon is passed into said one end of said adsorber and obtaining from said other end a second effluent comprising a branched-chain monoolefin hydrocarbon and a countercurrent purge step wherein a hydrocarbon vapor purge stream comprising a straight-chain paraffin, hydrocarbon is passed into said other end of said adsorber and obtaining from said one end a third effluent comprising a straight-chain monoolefin hydrocarbon and a straight-chain paraffin hydrocarbon, all of said steps being isobaric and isothermal, and the partial pressure of the straight chain paraffin content of the vapor purge stream being greater than the partial pressure of the straight-chain monoolefin content of the vapor feed stream whereby said adsorber is partially loaded with straight-chain paraffin during all steps of the process, and separately recovering branched-chain monoolefin from said first effluent and straight-chain monoolefin from said third effluent.

2. Process according to claim 1 wherein the straight-chain and branched-chain monoolefin of the feed stream being treated both have the same number of carbon atoms and the straight chain paraffin hydrocarbon of the vapor purge stream contains from one to three more carbon atoms than said monoolefins.

3. Process according to claim 2 wherein the monoolefins of the feed stream are butenes and the straight-chain paraffin hydrocarbon of the vapor purge stream is $n$-hexane.

* * * * *